(12) United States Patent
Zhong (10) Patent No.: US 12,369,564 B2
(45) Date of Patent: Jul. 29, 2025

(54) PET COMBING DEVICE WITH REPLACEABLE COMB HEADS

(71) Applicant: Yishun Zhong, Guangdong (CN)

(72) Inventor: Yishun Zhong, Guangdong (CN)

(73) Assignee: Shenzhen Arete Dynamis Technology Co., Ltd., Shenzhen (CN)

( * ) Notice: Subject to any disclaimer, the term of this patent is extended or adjusted under 35 U.S.C. 154(b) by 150 days.

(21) Appl. No.: 18/204,982

(22) Filed: Jun. 2, 2023

(65) Prior Publication Data

US 2023/0301271 A1    Sep. 28, 2023

(30) Foreign Application Priority Data

Mar. 27, 2023    (CN) .......................... 202320617326.3

(51) Int. Cl.
| | | |
|---|---|---|
| *A01K 13/00* | (2006.01) | |
| *A46B 5/00* | (2006.01) | |
| *A46B 5/02* | (2006.01) | |

(52) U.S. Cl.
CPC .......... *A01K 13/002* (2013.01); *A46B 5/0033* (2013.01); *A46B 5/0095* (2013.01); *A46B 5/026* (2013.01); *A46B 2200/1093* (2013.01)

(58) Field of Classification Search
CPC ...................... A01K 13/002; A46B 2200/1093
See application file for complete search history.

(56) References Cited

U.S. PATENT DOCUMENTS

| | | | | |
|---|---|---|---|---|
| 4,977,909 A | * | 12/1990 | Chou | A45D 24/10 132/123 |
| 2006/0207623 A1 | * | 9/2006 | Kung | A46B 15/00 132/119 |
| 2010/0122663 A1 | * | 5/2010 | Fernandez | A01K 13/00 119/612 |
| 2019/0191859 A1 | * | 6/2019 | Cavalcanti | A46B 5/00 |
| 2019/0246764 A1 | * | 8/2019 | Ott | A45D 24/40 |
| 2019/0307238 A1 | * | 10/2019 | Roundtree | A46B 11/06 |
| 2020/0196570 A1 | * | 6/2020 | Di | A01K 13/00 |
| 2022/0386565 A1 | * | 12/2022 | Pan | A01K 13/00 |

\* cited by examiner

*Primary Examiner* — Joshua J Michener
*Assistant Examiner* — Henry Hooper Mudd (57) ABSTRACT

A pet combing device includes a replaceable combing assembly and a combing device body. The combing device body includes an upper end part and a lower end handle part. One side of the upper end part is provided with an opened working chamber. The replaceable combing assembly is mounted in the working chamber. The upper end part of the combing device body is provided with a replacing button assembly. The replaceable combing assembly is detachably connected to the combing device body through the replacing button assembly. The upper end part of the combing device body is also provided with a latch button assembly which is used for switching a combing state and a dehairing state.

3 Claims, 9 Drawing Sheets

PET COMBING DEVICE WITH REPLACEABLE COMB HEADS

BACKGROUND OF THE INVENTION

1. Field of the Invention

The invention relates to pet care and more particularly to a pet combing device with replaceable comb heads.

2. Description of Related Art

With the gradually improved living quality, more and more people have kept pets in recent years, and among many pets, hairy animal, such as cats and dogs, is loved by people.

The pet combing is the biggest trouble for pet keepers, at present there are various pet combs for pet combing in the market, such as, a pet comb of which comb teeth may be conducted to remove pests, the comb teeth of this kind of pet comb are integrally designed with a housing, and the comb teeth have a fixed length, and therefore when combing the pets, whose hair length does not fit with the length of the comb teeth, the use and operation are not only inconvenient, but also the excellent combing and pest removal effects cannot be achieved, thereby easily resulting in an uncomfortable feeling to the pet.

The conventional pet combing device on the market has relatively simple functions. For example, a conventional a pet brush includes a pet brush upper cover, a pet brush middle base, a pet brush lower cover and a spring. The pet brush middle base is arranged between the pet brush upper cover and the pet brush lower cover, and shapes the pet brush upper cover, the pet brush lower cove and the pet brush middle base fit with each other, where the pet brush upper cover is covered on the pet brush middle base, and the pet brush upper cover is mutually buckled with the pet brush middle base through a clamping structure. When the animal fur needs to be combed and bathed, combing and smearing body wash or water need to be operated separately, causing time waste, and this problem is to be solved.

Now, a detachable and replaceable pet combing device compounded with multiple comb heads is desired.

SUMMARY OF THE INVENTION

The invention provides a pet combing device with replaceable comb heads, and the existing pet combing device is subjected to technical transformation, in order to solve the problem that the existing pet combing device has a relatively single function.

In order to implement the above purpose, the technical solution adopted by the invention is as follows:

A pet combing device with replaceable comb heads, including a replaceable combing assembly and a combing device body, where the combing device body consists of an upper end part and a lower end handle part, one side of the upper end part is provided with an opened working chamber, the replaceable combing assembly is mounted in the working chamber, the upper end part of the combing device body is provided with a replacing button assembly, the replaceable combing assembly is detachably connected to the combing device body through the replacing button assembly, and the upper end part of the combing device body is also provided with a latch button assembly which is used for switching a combing state and a dehairing state.

Preferably, the replaceable combing assembly is any one of a needle comb, a shaving comb, a hair-planting comb, a knife comb and a knotting comb.

Preferably, the replaceable combing assembly includes a combing plate part and a combing part, a working hole position is arranged in the combing plate part, the combing part is arranged at a back position of the combing plate part, a combing hair of the combing part is arranged in a manner of penetrating out along the working hole position, the combing plate part is detachably connected to the replacing button assembly, and the combing part is movably connected to the latch button assembly.

Preferably, one end of the combing plate part is provided with a replacing slot, the other end, away from the replacing slot, of the combing plate part is provided with a positioning buckle, a replacing button installation hole and a positioning slot are formed in the combing device body, the replacing button assembly includes a replacing button, a first spring and a spring stopper, the spring stopper is fixedly mounted inside the working chamber of the combing device body, the replacing button is arranged in a manner of penetrating through the replacing button installation hole, and the replacing button is connected to the spring stopper through the first spring; and a lower edge of the replacing button is convexly provided with a replacing buckle, which is buckled with the replacing slot, and the positioning buckle is buckled with the positioning slot.

Preferably, the latch button assembly includes a big button, a latch button and a first limiting block, a latch button installation hole is formed in the upper end part of the combing device body, the big button is movably mounted in the latch button installation hole, and a latch button is mounted on an upper surface of the big button; and the latch button is transversely and slidingly mounted and set in relative to the big button, a lower end of the latch button passes through an inner chamber of the big button and is connected to the first limiting block arranged at a bottom of the big button, a first limiting slot is also formed in the latch button installation hole, the first limiting block is buckled with the first limiting slot, a second spring is mounted between the combing part and the combing plate part, and an upper end of the combing part resists to the bottom of the big button.

Preferably, the combing plate part includes a bottom combing plate, an upper cover and a positioning column; the combing part includes a hair combing installation plate and a limiting column, the upper cover is fixedly connected to the bottom combing plate through the positioning column, the combing installation plate is sleeved on the positioning column, a combing hair is mounted at one side of the hair combing installation plate, the second spring resists between the hair combing installation plate and the bottom combing plate, and one side, away from the combing hair, of the hair combing installation plate, is convexly provided with the limiting column; and a guide slot is formed in the upper cover, and the limiting column passes through the guide slot and resists to the bottom of the big button.

Preferably, two positioning columns and two limiting columns are provided, the positioning columns are symmetrically distributed at the two sides of the bottom combing plate in left and right respectively, and the limiting columns are symmetrically distributed at the two sides of the hair combing installation plate in left and right respectively.

Preferably, two sides of the lower end handle part are provided with slip-resistant stripes.

The invention has the following advantages and benefits in comparison with the conventional art: the replaceable combing assembly is detachably mounted, so that the needle comb, the shaving comb, the hair-planting comb, the knife comb or the knotting comb can be replaced according to using demands. When replacement is required, the replacing comb is pressed and buckled for installation; and the replacing button is pressed, accessories pop up for being taken out. With a convenient use, a diversified function and a strong applicability, the invention saves more cost.

The invention is provided with the latch button assembly which is used for switching the combing state and the dehairing state. The combing part of the replaceable combing assembly can be locked at the position of the combing state in a manner of pressing the big button and sliding the latch button, so that the combing hair of the combing part penetrates out from the combing plate part for convenient work; when dehairing is required, the latch button slides, the combing part of the replaceable combing assembly lifts up under the action of the elastic force of the second spring, the big button is jacked up through the elastic force of the second spring, the combing hair of the combing part retreats from the combing plate part, so that the hair is blocked on the outer surface of the combing plate part, thereby realizing dehairing. The needle comb, the knife comb and the knotting comb can realize working of the combing state and the dehairing state through the button structure, and with the simple operation, the convenient and quick use and the higher work efficiency, additional cleaning for the combing part is not required.

The above and other objects, features and advantages of the invention will become apparent from the following detailed description taken with the accompanying drawings.

DETAILED DESCRIPTION OF THE INVENTION

Referring to FIGS. 1 to 9, a pet combing device in accordance with the invention comprises a replaceable combing assembly 1 and a combing device body 2 in which the combing device body 2 includes an upper end part 21 and a lower end handle part 22, one side of the upper end part 21 is provided with an opened working chamber 211, the replaceable combing assembly 1 is mounted in the working chamber 211, the upper end part 21 of the combing device body 2 is provided with a replacing button assembly 3, the replaceable combing assembly 1 is detachably connected to the combing device body 2 through the replacing button assembly 3, and the upper end part 21 of the combing device body 2 is also provided with a latch button assembly 4 which is used for switching a combing state and a dehairing state.

Figure 1:
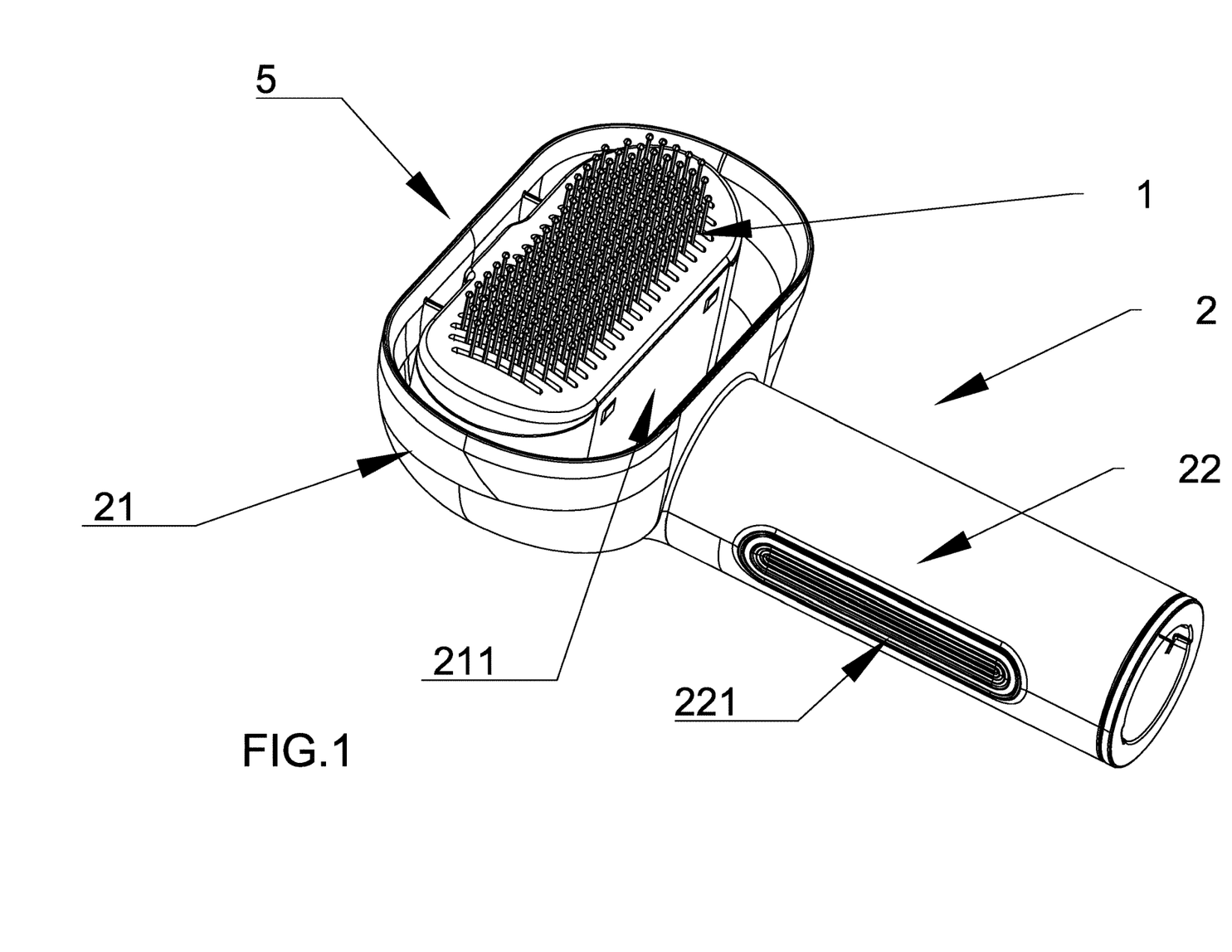
FIG. 1 is a perspective view of a pet combing device according to the invention.
Figure 2:
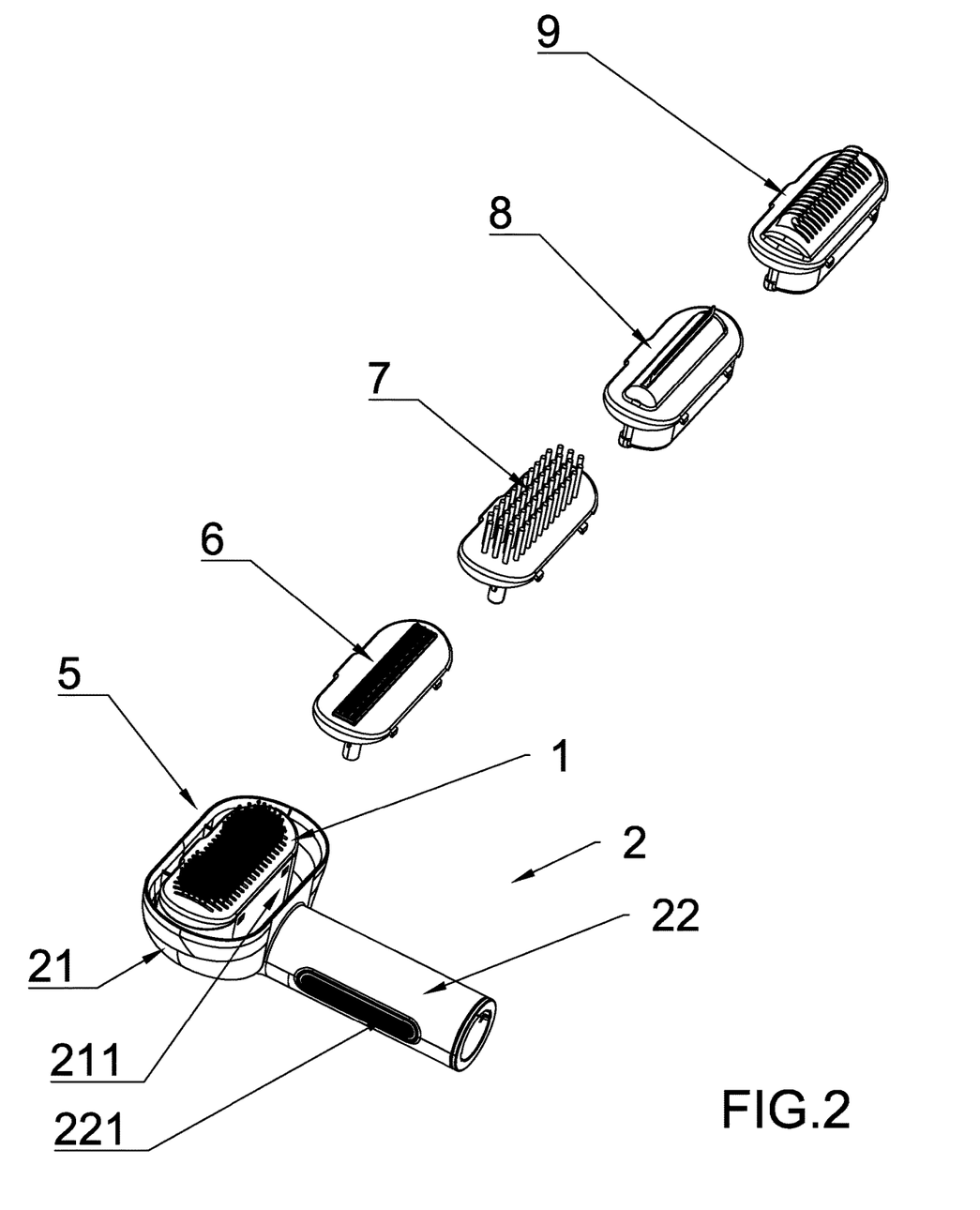
FIG. 2 is an exploded view of the pet combing device in FIG. 1.
Figure 3:
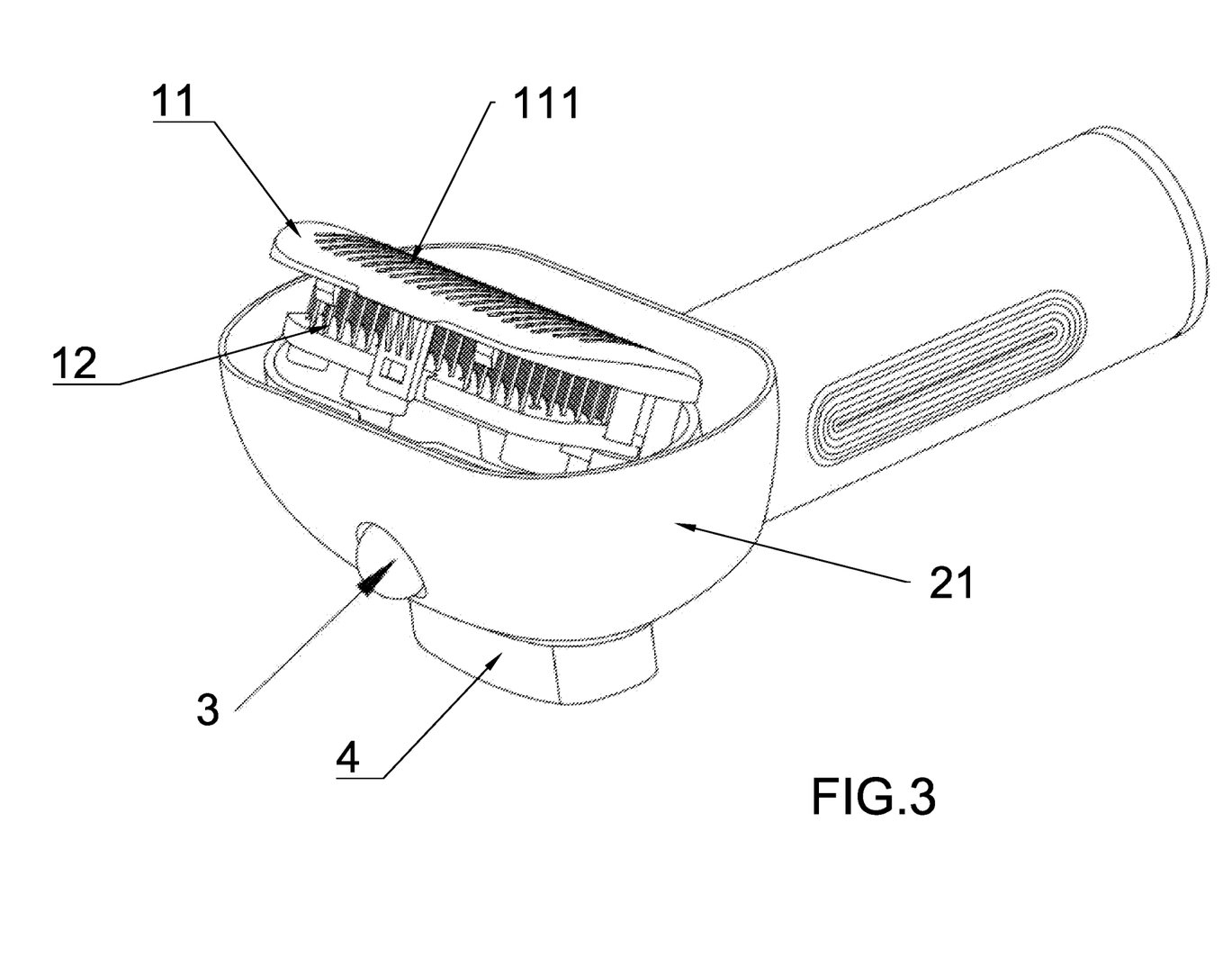
FIG. 3 is a perspective view showing a replaceable combing assembly being replaced.
Figure 4:
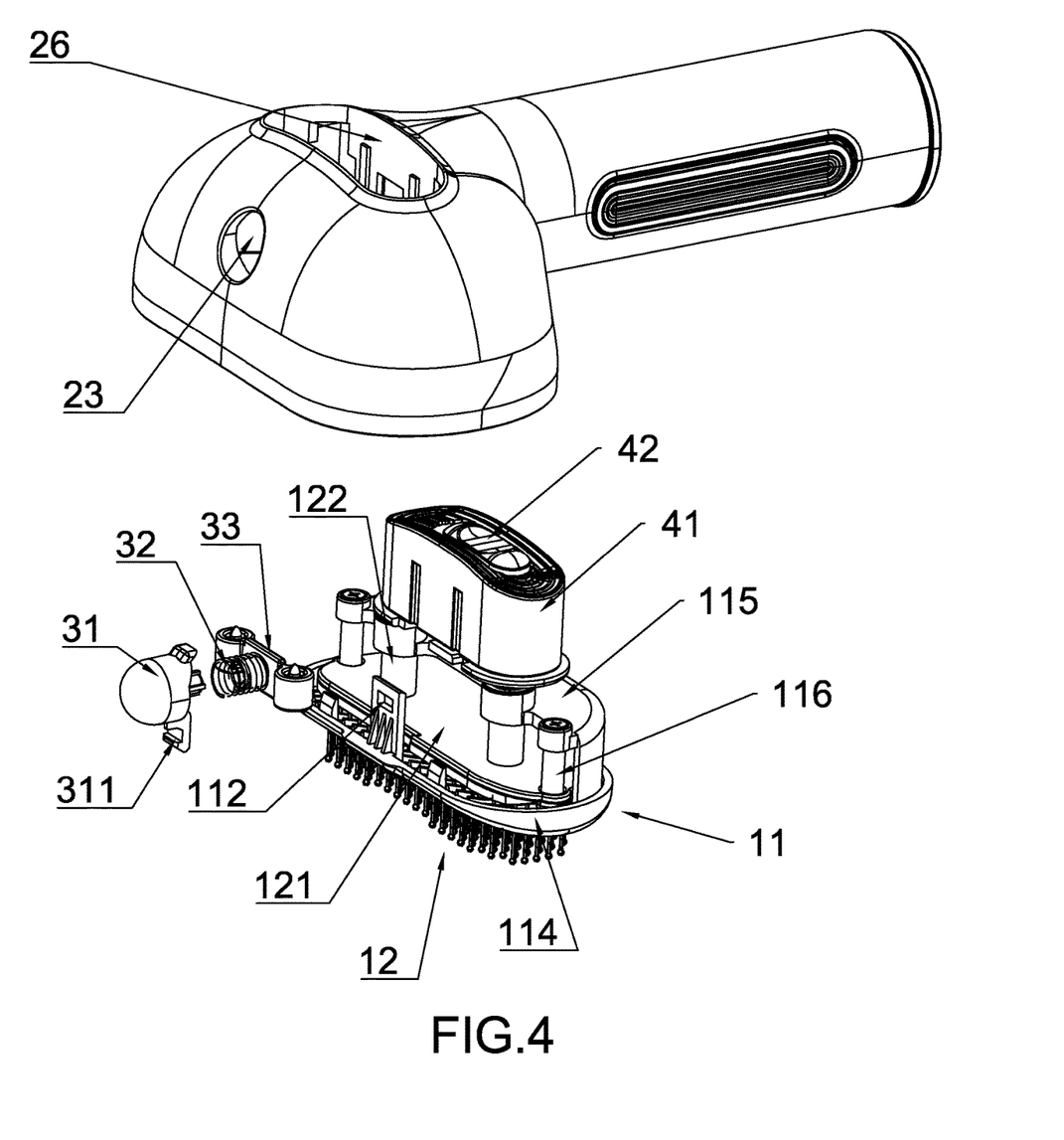
FIG. 4 is an exploded perspective view of the pet combing device in FIG. 1.
Figure 5:
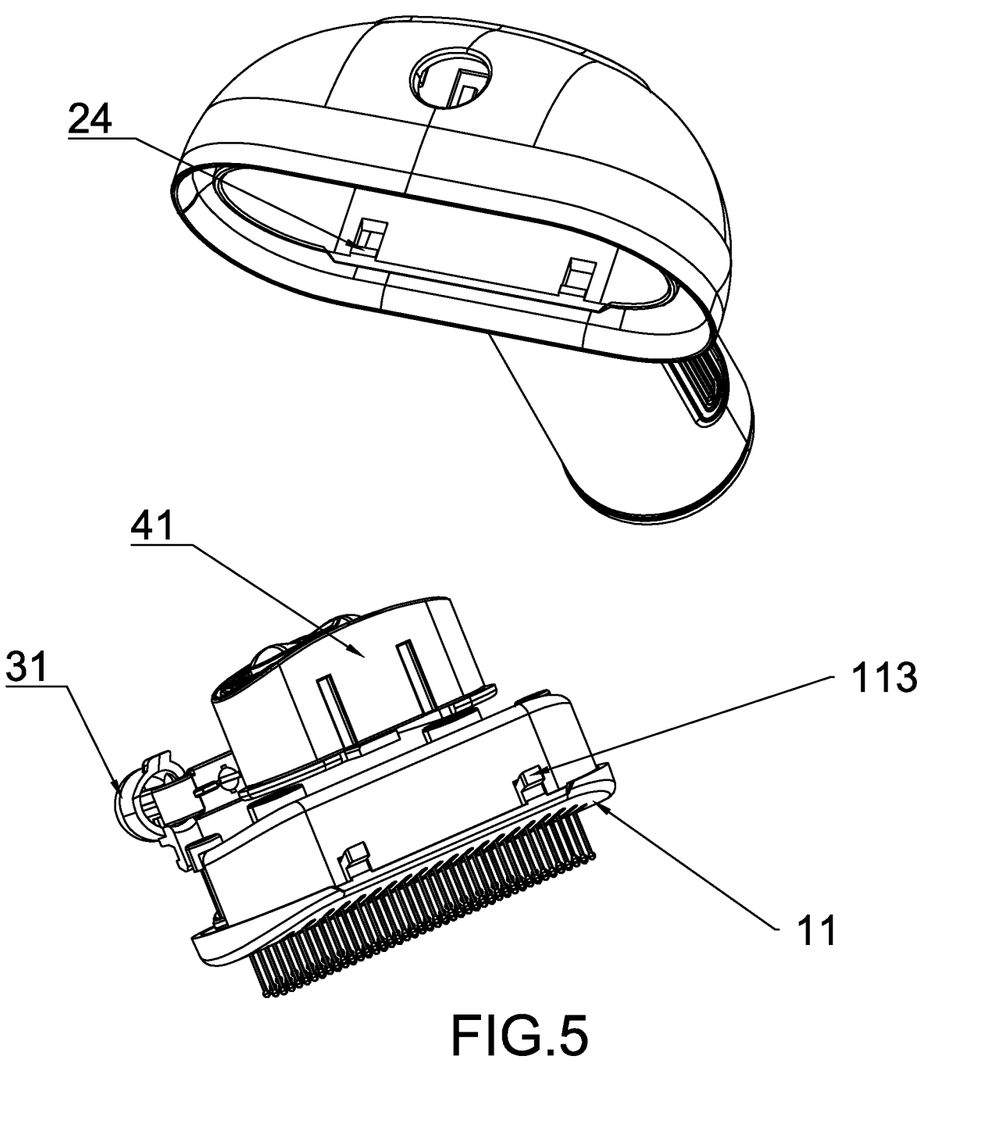
FIG. 5 is another exploded perspective view of the pet combing device in FIG. 1.
Figure 6:
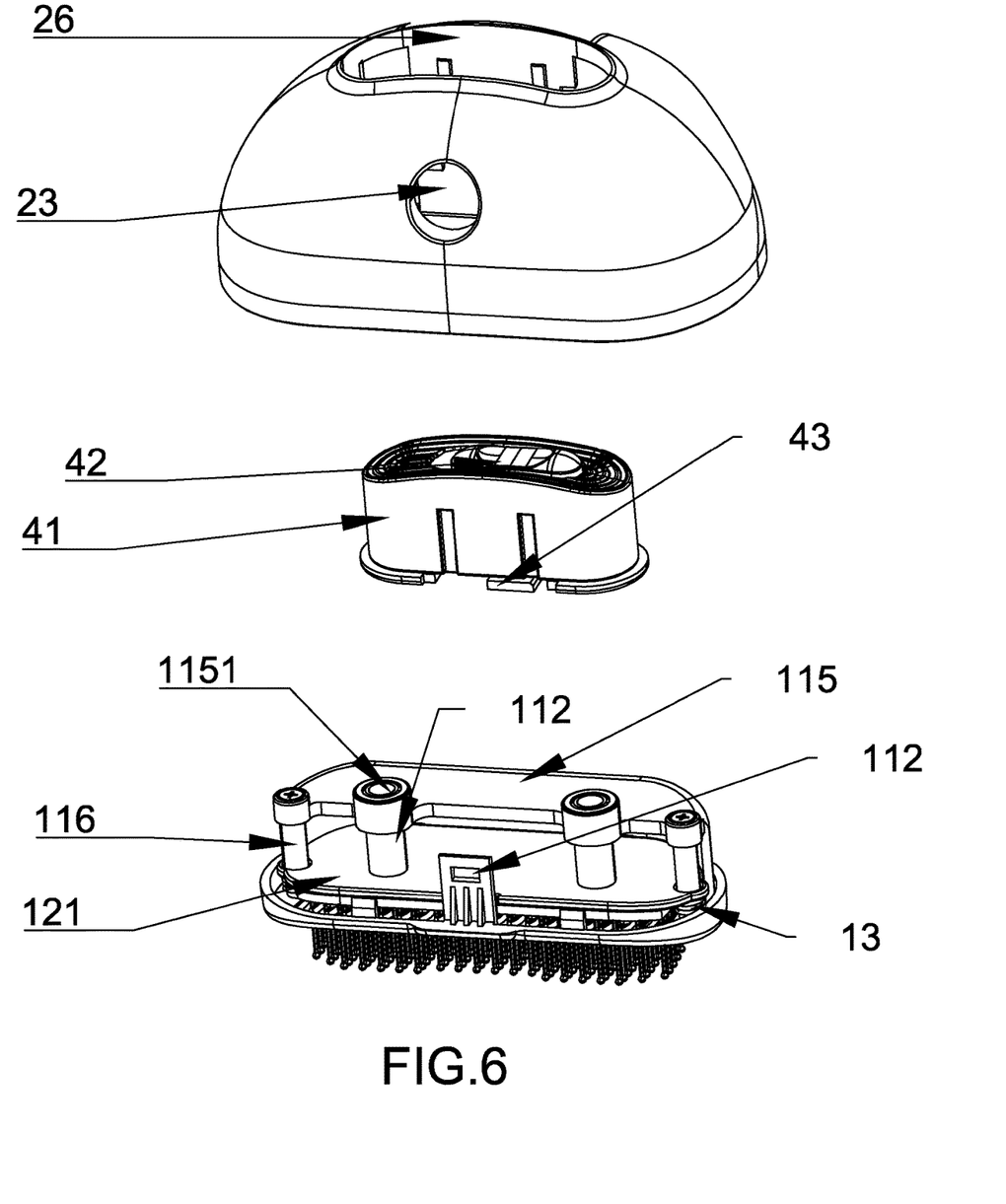
FIG. 6 is an exploded view of a latch button assembly, a combing part, and a combing plate part.
Figure 7:
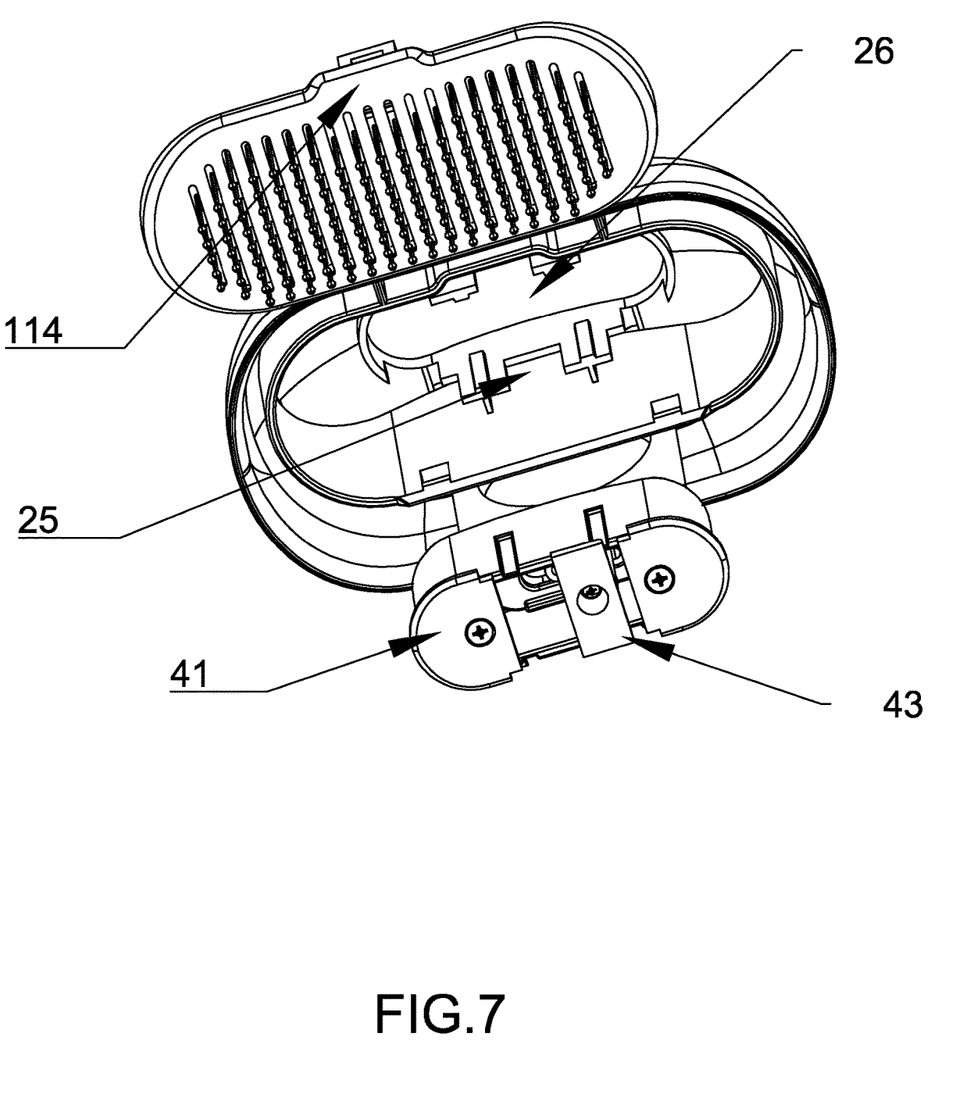
FIG. 7 is a perspective view showing a latch button installation hole.

Further, in order to realize the multifunctionality of the replaceable combing assembly 1, the replaceable combing assembly 1 is any one of a needle comb 5, a shaving comb 6, a hair-planting comb 7, a knife comb 8 and a knotting comb 9, which are as shown in FIG. 1, respectively.

Further, in order to realize exposing the combing hair of the combing assembly from the working chamber 211 of the combing device body 2 for convenient operation, the replaceable combing assembly 1 includes a combing plate part 11 and a combing part 12, a working hole position 111 is arranged in the combing plate part 11, the combing part 12 is arranged at a back position of the combing plate part 11, a combing hair of the combing part 12 is arranged in a manner of penetrating out along the working hole position 111, the combing plate part 11 is detachably connected to the replacing button assembly 3, and the combing part 2 is movably connected to the latch button assembly 4.

Further, in order to realize dismounting and replacing the replaceable combing assembly 1 from the combing device body 2, one end of the combing plate part 11 is provided with a replacing slot 112, the other end, away from the replacing slot 112, of the combing plate part 11 is provided with a positioning buckle 113, a replacing button installation hole 23 and a positioning slot 24 are formed in the combing device body 2, the replacing button assembly 3 includes a replacing button 31, a first spring 32 and a spring stopper 33, the spring stopper 33 is fixedly mounted inside the working chamber 211 of the combing device body 2, the replacing button 31 is arranged in a manner of penetrating through the replacing button installation hole 23, and the replacing button 31 is connected to the spring stopper 33 through the first spring 32; and a lower edge of the replacing button 31 is convexly provided with a replacing buckle 311, which is buckled with the replacing slot 112, and the positioning buckle 113 is buckled with the positioning slot 24. The positioning buckle 113 of the combing plate part 11 is buckled in the positioning slot 24 of the combing device body 2 by pressing the replaceable combing assembly 1, the replacing slot 112 of the combing plate part 11 is buckled by the replacing buckle 311 of the replacing button 31 that is mounted on the combing device body 2, and the replaceable combing assembly 1 is locked in the working chamber 211 of the combing device body 2.

When the replaceable combing assembly 1 is required to be taken down, the replacing button 31 is pressed, so that the replacing buckle is separated from the interior of the replacing slot 112, and the replaceable combing assembly 1 can be taken out from the working chamber 211 of the combing device body 2.

Further, in order to realize that the latch button 42 can adjust the working state and position of the combing part 12, the latch button assembly 4 includes a big button 41, a latch button 42 and a first limiting block 43, a latch button installation hole 26 is formed in the upper end part 21 of the combing device body 2, the big button 41 is movably mounted in the latch button installation hole 26, and a latch button 42 is mounted on an upper surface of the big button 41; and the latch button 42 is transversely and slidingly mounted and set in relative to the big button 41, a lower end of the latch button 42 passes through an inner chamber of the big button 41 and is connected to a first limiting block 43 arranged at a bottom of the big button 41, a first limiting slot 25 is also formed in the latch button installation hole 26, the first limiting block 43 is buckled with the first limiting slot 25, the second spring 13 is mounted between the combing part 12 and the combing plate part 11, and an upper end of the combing part 12 resists to the bottom of the big button 41.

Further, the combing plate part 11 includes a bottom combing plate 114, an upper cover 115 and a positioning column 116; the combing part 12 includes a hair combing installation plate 121 and a limiting column 122, the upper cover 115 is fixedly connected to the bottom combing plate 114 through the positioning column 116, the combing installation plate 121 is sleeved on the positioning column 116, a combing hair is mounted at one side of the hair combing installation plate 121, the second spring 13 resists between the hair combing installation plate 121 and the bottom combing plate 114, and one side, away from the combing hair, of the hair combing installation plate 121, is convexly provided with the limiting column 122; and a guide slot 1151 is formed in the upper cover 115, and the limiting column 122 passes through the guide slot 1151 and resists to the bottom of the big button 41. The working hole position 111 is arranged on the bottom combing plate 114.

Figure 8:
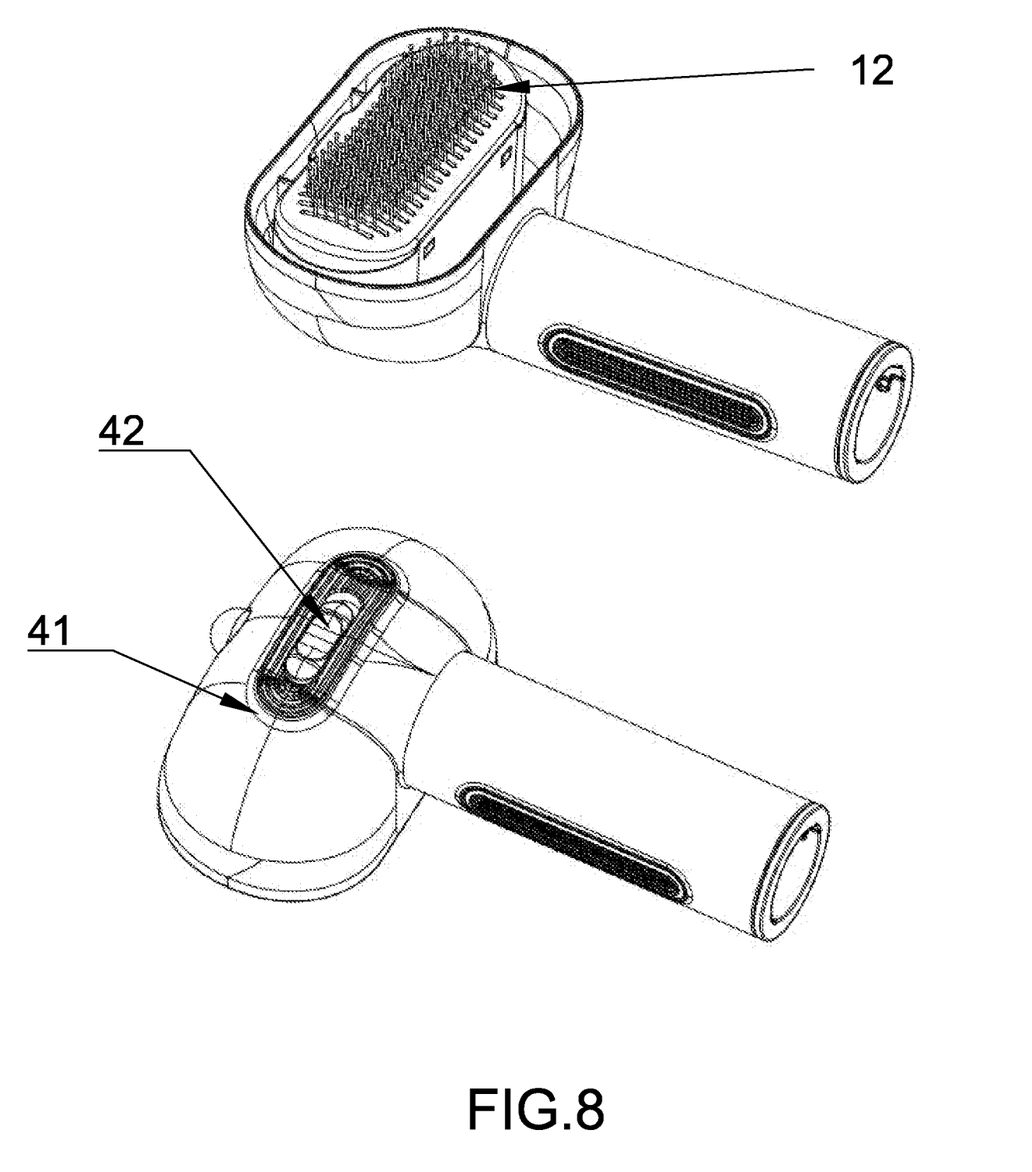
FIG. 8 schematically depicts a combing state of the pet combing device in FIG. 1.

The limiting column 122 can move downwards by pressing the big button 41, so that the combing hair of the hair combing installation plate 121 penetrates out of the working hole position 111 of the bottom combing plate 114, and the first limiting block 43 can be separated from the first limiting slot 25; and afterwards the first limiting block 43 arranged at the bottom of the big button 41 can horizontally slide in relative to a notch position of the first limiting slot 25 by sliding the latch button 42, the second spring 13 pushes the hair combing installation plate 121 and the limiting column 122 so as to push the big button 41 to move upwards, and however the first limiting block 43 is resisted by the lower edge shell part of the first limiting slot 25, so that a height position of the hair combing installation plate 121 is locked to keep the working state that the combing hair penetrates out, that is, the combing state.

Figure 9:
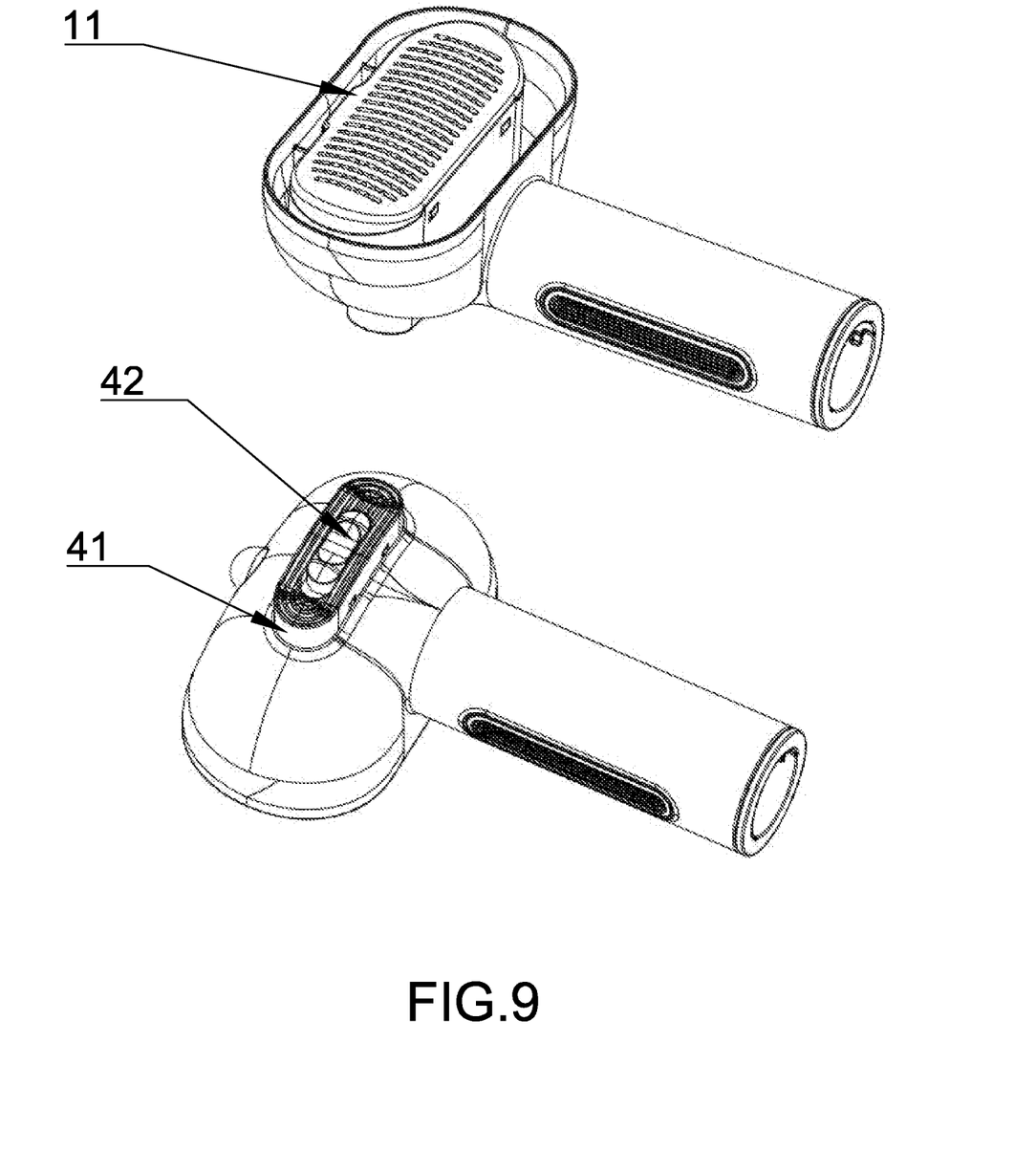
FIG. 9 schematically depicts a dehairing state of the pet combing device in FIG. 1.

When dehairing is required, the first limiting block 43 moves along the notch direction of the first limiting slot 25 by sliding the latch button 42, and afterwards the big button 41 is driven by the second spring 13 so as to push the first limiting block 43 on the latch button 42 to move upwards along the first limiting slot 25, so that the big button 41 pops up; and at this time, the hair combing installation plate 121 is pushed by the second spring 13 to pop up, so that the combing hair retreats from the working hole position 111 of the bottom combing plate 114, thereby realizing the dehairing state.

When the knife comb 8, the needle comb 5 or the knotting comb 9 is used, the replaceable coming assembly 1 is switched, so that the combing state and the dehairing state can be switched through the latch button assembly 4, with a more convenience use and more diversified functions.

Further, in order to obtain more stable installing and moving effects, two positioning columns 116 and two limiting columns 122 are provided, the positioning columns 116 are symmetrically distributed at the two sides of the bottom combing plate 114 in left and right respectively, and the limiting columns 122 are symmetrically distributed at the two sides of the hair combing installation plate 121 in left and right respectively.

Further, in order to obtain better holding hand feeling and better slip-resistant effect, two sides of the lower end handle part 22 are provided with slip-resistant stripes 221.

In this embodiment, the replaceable combing assembly may be detachably mounted, so that the needle comb, the shaving comb, the hair-planting comb, the knife comb or the knotting comb can be replaced according to using demands. When replacement is required, the replacing comb is pressed and buckled for installation; and the replacing button is pressed, accessories pop up for being taken out. With a convenient use, a diversified function and a strong applicability, the invention saves more cost.

This embodiment is provided with the latch button assembly which is used for switching the combing state and the dehairing state. The combing part of the replaceable combing assembly is locked at the position of the combing state in a manner of pressing the big button and sliding the latch button, so that the combing hair of the combing part penetrates out from the combing plate part for convenient work; when dehairing is required, the latch button slides, the combing part of the replaceable combing assembly lifts up under the action of the elastic force of the second spring, the big button is jacked up through the elastic force of the second spring, the combing hair of the combing part retreats from the combing plate part, so that the hair is blocked on the outer surface of the combing plate part, thereby realizing dehairing. The needle comb, the knife comb and the knotting comb can realize working of the combing state and the dehairing state through the button structure, and with a simple operation, a convenient and quick use and a higher work efficiency, additional cleaning for the combing part is not required.

While the invention has been described in terms of preferred embodiments, those skilled in the art will recognize that the invention can be practiced with modifications within the spirit and scope of the appended claims.

What is claimed is:
1. A pet combing device, comprising:
a replaceable combing assembly; and
a combing device body,
wherein the combing device body includes an upper end part and a lower end handle part, one side of the upper end part is provided with an opened working chamber, the replaceable combing assembly is mounted in the working chamber, the upper end part of the combing device body is provided with a replacing button assembly, the replaceable combing assembly is detachably connected to the combing device body through the replacing button assembly, and the upper end part of the combing device body is also provided with a latch button assembly which is used for switching a combing state and a dehairing state;
wherein the replaceable combing assembly comprises a combing plate part and a combing part, a working hole position is formed in the combing plate part, the combing part is arranged at a back position of the combing plate part, a combing hair of the combing part is arranged in a manner of penetrating out along the working hole position, the combing plate part is detachably connected to the replacing button assembly, and the combing part is movably connected to the latch button assembly; and
wherein the latch button assembly comprises a big button, a latch button and a first limiting block, a latch button installation hole is formed in the upper end part of the combing device body, the big button is movably mounted in the latch button installation hole, and the latch button is mounted on an upper surface of the big button; and the latch button is transversely and slidingly mounted and set in relative to the big button, a lower end of the latch button passes through an inner chamber of the big button and is connected to the first limiting block arranged at a bottom of the big button, a first limiting slot is also formed in the latch button installation hole, the first limiting block is buckled with the first limiting slot, a second spring is mounted between the combing part and the combing plate part, and an upper end of the combing part resists to the bottom of the big button.

2. The pet combing device of claim 1, wherein the combing plate part comprises a bottom combing plate, an upper cover and a positioning column; the combing part comprises a hair combing installation plate and a limiting column, the upper cover is fixedly connected to the bottom combing plate through the positioning column, the combing installation plate is sleeved on the positioning column, a combing hair is mounted at one side of the hair combing installation plate, the second spring resists between the hair combing installation plate and the bottom combing plate, and one side, away from the combing hair, of the hair combing installation plate, is convexly provided with the limiting column; and a guide slot is formed in the upper cover, and the limiting column passes through the guide slot and resists to the bottom of the big button.

3. The pet combing device of claim 2, wherein two positioning columns and two limiting columns are provided, the positioning columns are symmetrically distributed at the two sides of the bottom combing plate in left and right respectively, and the limiting columns are symmetrically distributed at the two sides of the hair combing installation plate in left and right respectively.

\* \* \* \* \*